US011829735B2

(12) United States Patent
Kanagaraj et al.

(10) Patent No.: US 11,829,735 B2
(45) Date of Patent: Nov. 28, 2023

(54) ARTIFICIAL INTELLIGENCE (AI) FRAMEWORK TO IDENTIFY OBJECT-RELATIONAL MAPPING ISSUES IN REAL-TIME

(71) Applicant: Bank of America Corporation, Charlotte, NC (US)

(72) Inventors: Deepan Kanagaraj, Chennai (IN); Magesh Sripathy, Chennai (IN); Sachin Thakral, Hansi (IN); Vishnuvardhan Rao Regalla, Hyderabad (IN); Prasanna K, Chennai (IN); Suki Ramasamy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 182 days.

(21) Appl. No.: 17/375,651

(22) Filed: Jul. 14, 2021

(65) Prior Publication Data

US 2023/0013748 A1 Jan. 19, 2023

(51) Int. Cl.
*G06F 9/44* (2018.01)
*G06F 8/41* (2018.01)
*G06F 16/28* (2019.01)
*G06N 5/022* (2023.01)

(52) U.S. Cl.
CPC .............. *G06F 8/41* (2013.01); *G06F 16/284* (2019.01); *G06N 5/022* (2013.01)

(58) Field of Classification Search
CPC .......... G06F 8/41; G06F 16/284; G06N 5/022
USPC ....................................................... 717/140
See application file for complete search history.

(56) References Cited

U.S. PATENT DOCUMENTS

| 6,108,648 | A | * | 8/2000 | Lakshmi ........... G06F 16/24545 |
| 7,516,121 | B2 | | 4/2009 | Liu et al. |
| 7,647,298 | B2 | * | 1/2010 | Adya .................. G06F 16/2445 |
| | | | | 707/999.002 |
| 7,730,065 | B2 | * | 6/2010 | Fisher .................. G06F 16/284 |
| | | | | 707/736 |
| 8,145,685 | B2 | | 3/2012 | Thompson et al. |
| 9,208,211 | B2 | | 12/2015 | Surtani et al. |
| 10,268,742 | B2 | | 4/2019 | Adya et al. |

FOREIGN PATENT DOCUMENTS

KR 101411083 B1 7/2014

OTHER PUBLICATIONS

Lakshmi et al., "Selectivity Estimation in Extensible Databases—A Neural Network Approach", 1998, Proceedings of the 24th VLDB Conference, New York, 1998, pp. 623-627. (Year: 1998).*
Song et al., "Metadata Invariants: Checking and Inferring Metadata Coding Conventions", 2012, IEEE, pp. 694-704. (Year: 2012).*
Bernstein et al., "Incremental Mapping Compilation in an Object-to-Relational Mapping System", 2013, ACM, pp. 1269-1280. (Year: 2013).*

* cited by examiner

*Primary Examiner* — Ted T. Vo
(74) *Attorney, Agent, or Firm* — Banner & Witcoff, Ltd.

(57) ABSTRACT

Various aspects of this disclosure relate to determining mapping issues in object relational mapping (ORM). An artificial intelligence (AI) model may be trained to identify errors in mapping between relational databases and objects during code compilation. Multiple AI models may be used, with different models being associated with different programming frameworks, thereby making this technique framework agnostic.

18 Claims, 7 Drawing Sheets

```
@Entity
@Table(name = "STUDENT")
public class Student {
    @Id
    @GeneratedValue(strategy = GenerationType.AUTO)
    private Long id;

@Column(name = "STUDENT_NAME", length = 50, nullable = false, unique = false)
    private String name;

@Column(name = "age")
    private Integer age;

@Temporal(TemporalType.DATE)
    private Date birthDate;

@Column(name = "gender")
    private String gender;

@ManyToOne
    @JoinColumn(name = "DEPARTMENT_ID")
    private Department department;

@OneToMany
    @JoinColumn(name = "STUDENT_ID")
    private Set<ExamScore> examScores;

public Long getId() {
        return id;
    } public void setId(Long id) {
        this.id = id;
    }
}
```

```
jms_object_model.py from sqlalchemy import ForeignKey, Sequence, Column, Integer, String, Text, DateTime, Boolean
from sqlalchemy.orm import declarative_base, relationship, backref __all__ = ['JobRequest', 'JobStatus', 'JobSparkDetail', 'Base']

Base = declarative_base()

class JobRequest(Base):
    __tablename__ = 'jms_job_request' submission_id = Column(String(250), primary_key=True)
    submission_name = Column(String(250), nullable=False)
    request = Column(Text, nullable=False)
    is_cancelled = Column(Boolean, nullable=False, default=False)
    callback_url = Column(String(250))
    inserted_at = Column(DateTime, nullable=False)
    updated_at = Column(DateTime, nullable=False)
    updated_by = Column(String(20), nullable=False)

job_statuses = relationship('JobStatus', backref=backref('job_request', uselist=False))
    spark_detail = relationship('JobSparkDetail', backref=backref('job_request', uselist=Fals
```

ARTIFICIAL INTELLIGENCE (AI) FRAMEWORK TO IDENTIFY OBJECT-RELATIONAL MAPPING ISSUES IN REAL-TIME

TECHNICAL FIELD

Aspects of the disclosure relate to software development, and more specifically to converting data between incompatible systems using object relational mapping (ORM).

BACKGROUND

ORM frameworks provides the capability to map an object to a relational database. This may enable operations on a database at the object level instead of using structured query language (SQL) queries. An ORM library encapsulates the code needed to manipulate the database, allowing a developer to interact directly with an object in the same language being used for coding instead of connecting to a database, and reading or manipulating data through SQL queries.

ORM frameworks are light weight and can be called anytime during code development. However, there exists a potential for incorrect mapping to be used between an object and a relational database, especially when the database is queried multiple times. In the current technology, wrong mappings can be identified only during run time and not during code compilation (e.g., during build). This may cause inefficiencies in code development in the form of additional manual overhead to review the ORM framework and time delays for code development.

SUMMARY

Aspects of the disclosure provide solutions that address and overcome technical problems associated with mapping issues that may be present in ORM frameworks. In particular, various aspects of this disclosure relate to artificial intelligence (AI)-based approaches for identifying mapping issues during compilation of source code.

In one embodiment, a method is disclosed for validating object-relational mapping (ORM) used in a plurality of source code files submitted via a user device. The illustrative method may comprise generating ORM metadata, based on ORM files and using a natural language processing (NLP) model; determining attributes associated with a relational database; and validating, based on a comparison between the ORM metadata and the attributes associated with the relational databases, the ORM metadata. The method may further comprise additional steps of: receiving, from the user device, a request for compilation of the plurality of source code files; identifying one or more ORM files among the plurality of source code files, wherein the one or more ORM files map relational databases to objects referenced by the source code files; and sending, to the user device, a validation indication. In some examples, the user device may display the validation indication within the IDE.

In yet another embodiment, a non-transitory computer-readable medium may store computer-executable instructions that, when executed by a computer processor, causes a computing platform to perform various steps. Some illustrative steps includes, but are not limited to causing to train an artificial intelligence (AI) model based on attributes associated with databases stored in a relational database server; and receive a request for compilation of a plurality of source code files. Furthermore, based on receiving the request for compilation, the computing platform may identify, among the plurality of source code files, one or more ORM files; validate, based on the AI model, the one or more ORM files; and send, to a user device, based on the validation of the one or more ORM files, a validation indication. In some examples, the request for compilation of a plurality of source code files may be received from a user device. And, the attributes (e.g., tables included in the one or more databases, columns included in the one or more databases, or combination thereof) associated with databases may be determined based on a deployment log, in some examples.

Furthermore, in some embodiments, the computing platform may further: determine ORM metadata (e.g., indications of tables, indications of columns, or combination thereof) based on the ORM files; store, based on one or more criteria, attributes associated with the databases in a database catalog file; and/or validate the one or more ORM files based on the database catalog file.

In some examples, the sending the validation indication may comprise sending an error notification based on determining that the ORM metadata does not match attributes of the relational database. In addition, in some examples, the deployment log may store the attributes associated with the databases when the databases are submitted to the relational database server; but in other examples, the deployment log may store the attributes associated with the databases when the databases are edited in the relational database server.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect. The examples and arrangements described are merely some example arrangements in which the systems described herein may be used. Various other arrangements employing aspects described herein may be used without departing from the invention.

Various examples described herein enable identification of ORM issues at compilation time using artificial intelligence (AI) models. Techniques described herein are language agnostic and a common framework may be deployed for identification of ORM issues, irrespective of the specific ORM framework and/or underlying programming languages. The common framework may comprise multiple AI models, each corresponding to a different ORM framework and a different programming language. An AI model may be selected from the multiple AI models based on a natural language processing (NLP)-based algorithm that analyses source code files.

Figure 1A:
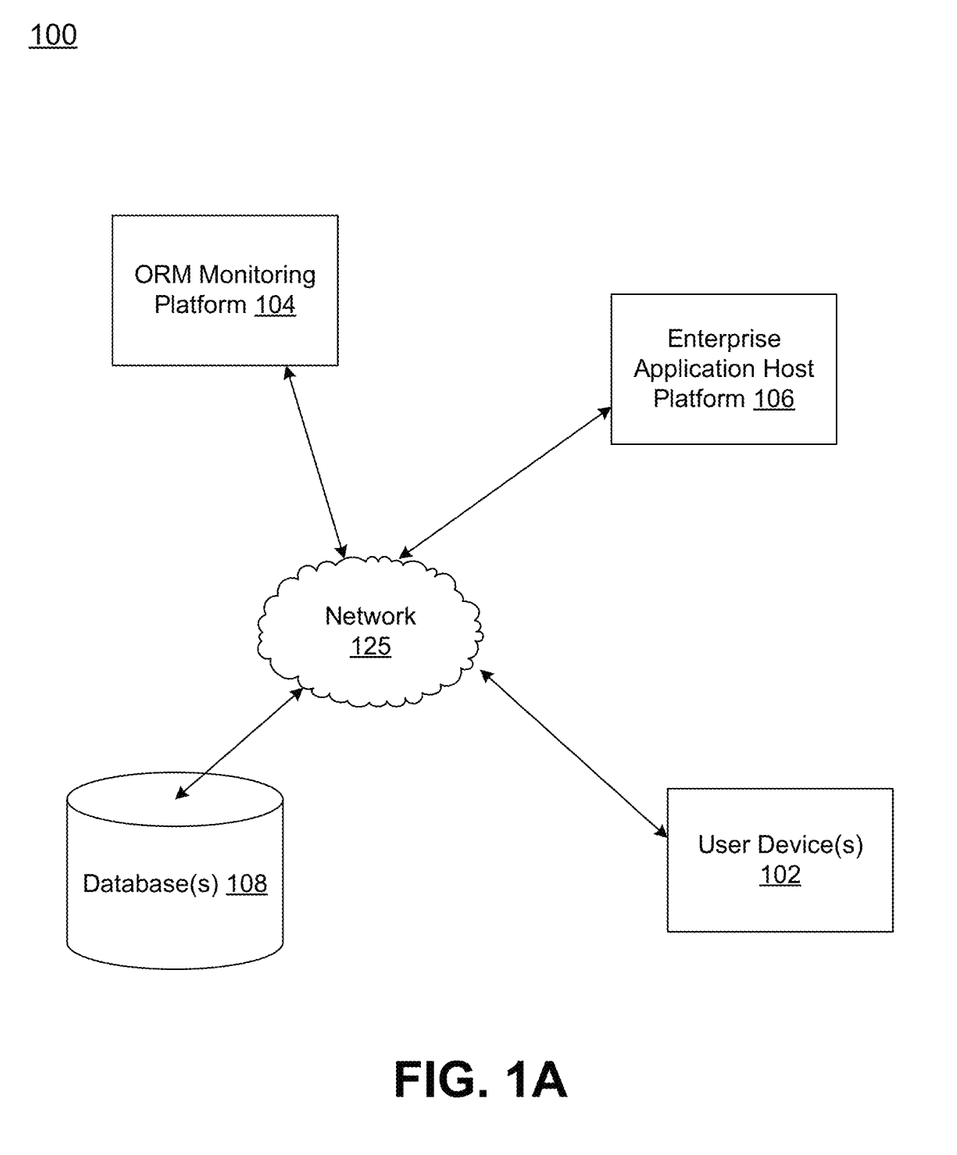
FIG. 1A shows an illustrative computing environment for identifying ORM issues, in accordance with one or more arrangements.

FIG. 1A shows an illustrative computing environment 100 for identifying ORM issues, in accordance with one or more arrangements. The computing environment 100 may comprise one or more devices (e.g., computer systems, communication devices, and the like). The computing environment 100 may comprise, for example, an ORM monitoring platform 104, an enterprise application host platform 106, relational database(s) 108, and/or one or more user devices 102. The one or more of the devices and/or systems, may be linked over a network 125 associated with an enterprise organization. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.).

The ORM monitoring platform 104 may comprise one or more computing devices and/or other computer components (e.g., processors, memories, communication interfaces) configured to perform one or more functions as described herein. Further details associated with the architecture of the ORM monitoring platform 104 are described with reference to FIG. 1B.

The enterprise application host platform 106 may comprise one or more computing devices and/or other computer components (e.g., processors, memories, communication interfaces). In addition, the enterprise application host platform 106 may be configured to host, execute, and/or otherwise provide one or more enterprise applications. For example, the enterprise application host platform 106 may be configured to provide an integrated development environment (IDE) to one or more associated users within the network 125. The users may access the IDE via the user devices 102. The IDE may be for source code development, compilation, debugging, and/or other operations. The IDE may also enable the user devices 102 to interface with the relational database(s) 108 to query, edit, and/or delete database entries/tables.

The user device(s) 102 may be computing devices (e.g., desktop computers, laptop computers) or mobile computing device (e.g., smartphones, tablets) connected to the network 125. The user device(s) 102 may be configured to enable the user to access the various functionalities provided by the devices, applications, and/or systems in the network 125.

The database(s) 108 may comprise one or more servers (e.g., relational database server(s)) or other computing devices that may be associated computer storage media. The database(s) 108 may be stored in the form of relational databases that may be queried/edited via SQL. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the user devices 102. An ORM framework may be used by the user devices 102 to convert the relational databases into virtual object databases for operations manipulation via object-oriented programming languages.

In one or more arrangements, the ORM monitoring platform 104, the enterprise application host platform 106, the user devices 102, the databases 108, and/or the other devices/systems in the computing environment 100 may be any type of computing device capable of receiving input via a user interface, and communicating the received input to one or more other computing devices in the computing environment 100. For example, the ORM monitoring platform 104, the enterprise application host platform 106, the user devices 102, the databases 108, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the ORM monitoring platform 104, the enterprise application host platform 106, the user devices 102, the databases 108, and/or the other devices/systems in the computing environment 100 may, in some instances, be and/or comprise special-purpose computing devices configured to perform specific functions.

Figure 1B:
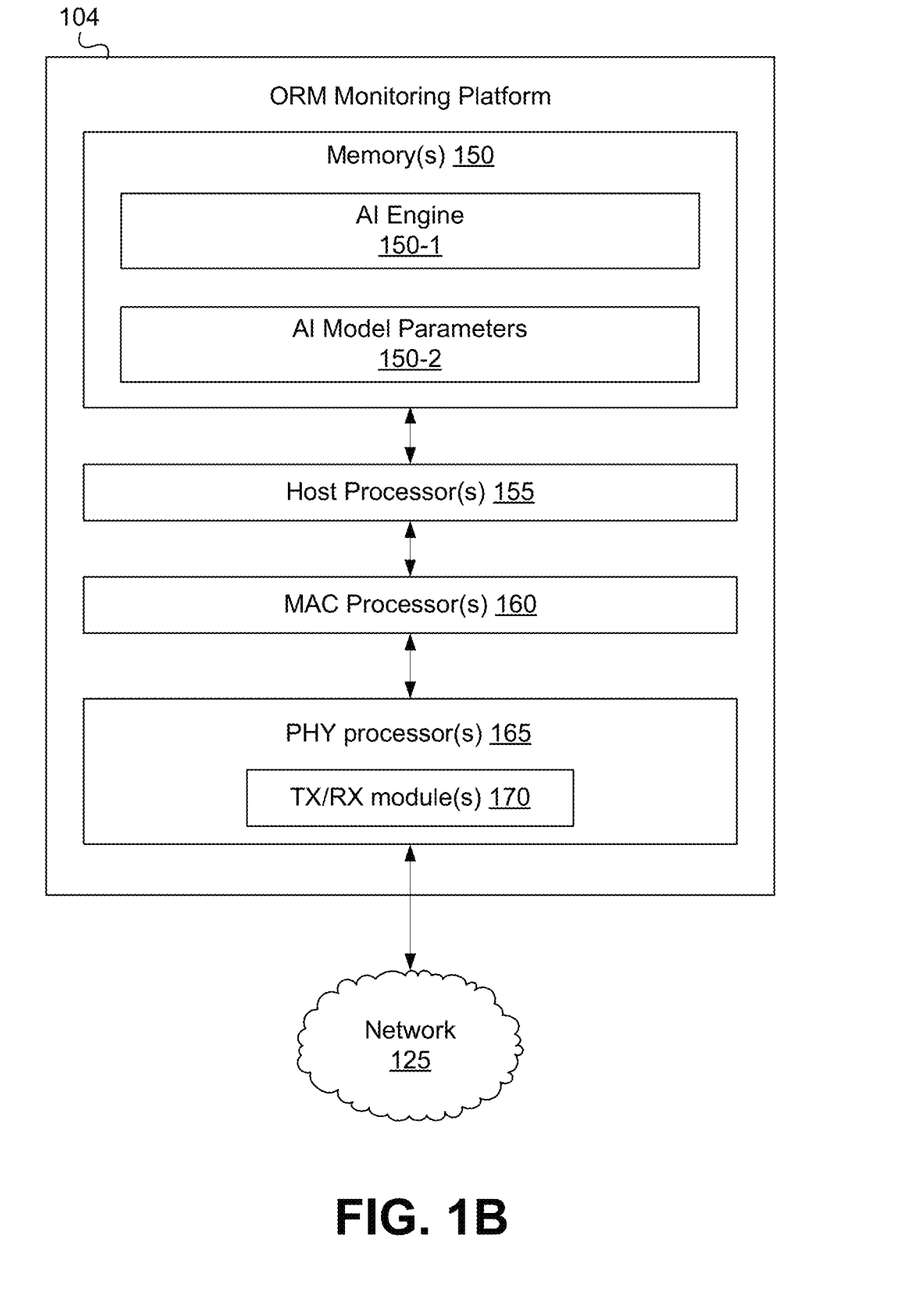
FIG. 1B shows an example ORM monitoring platform, in accordance with one or more examples described herein.

FIG. 1B shows an example ORM monitoring platform 104 in accordance with one or more examples described herein. The ORM monitoring platform 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The ORM monitoring platform 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. Memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the ORM monitoring platform 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155.

Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the ORM monitoring platform 104 may be configured to execute machine readable instructions stored in memory 150. The memory 150 may comprise (i) one or more program modules/engines having instructions that when executed by the one or more processors cause the ORM monitoring platform 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the ORM monitoring platform 104 and/or by different computing devices that may form and/or otherwise make up the ORM monitoring platform 104. For example, the memory 150 may have, store, and/or comprise the AI engine 150-1 and/or AI model parameters 150-2 (e.g., coefficients/weights associated with a neural network) corresponding to a plurality of AI models. The AI engine 150-1 may have instructions that direct and/or cause the ORM monitoring platform 104 to perform one or more operations of the ORM monitoring platform 104 as discussed herein. The AI engine 150-1 may have instructions that may cause the ORM monitoring platform 104 to implement a neural network based on the AI model parameters. For example, the AI engine 150-1 may have instructions that may cause the ORM monitoring platform 104 to perform functions related to ORM file identification, natural language processing (NLP) for determining of ORM metadata, and/or for determining errors in ORM (e.g., between objects and relational databases).

The AI engine 150-1 may receive data and, using one or more machine learning algorithms, may generate one or more machine learning datasets for performing various operations described herein (e.g., generation of AI models). Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

While FIG. 1A illustrates the ORM monitoring platform 104, the enterprise application host platform 106, the user devices 102, and the databases 108, as being separate elements connected in the private network 125, in one or more other arrangements, functions of one or more of the above may be integrated in a single device/network of devices. For example, elements in the ORM monitoring platform 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the enterprise application host platform 106, and/or the user devices 102.

Figure 2:
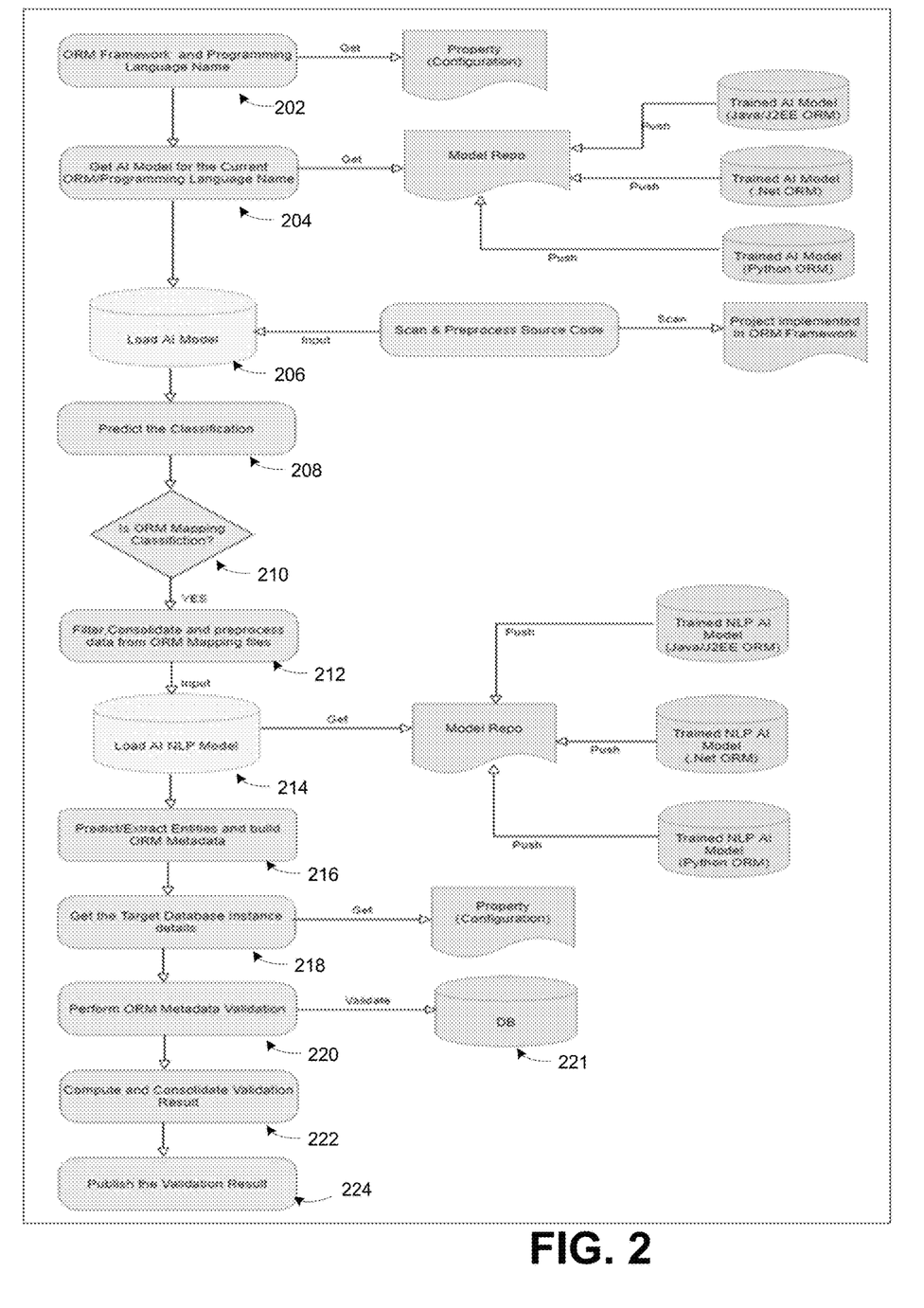
FIG. 2 shows an example method for identification of ORM issues, in accordance with one or more examples described herein.

FIG. 2 shows an example method for identification of ORM issues. In an arrangement, the example method may be performed at the ORM monitoring platform 104 during compilation of a source code. At step 202, the ORM monitoring platform 104 may determine the properties associated with source code files (e.g., as input at the user devices 102) corresponding to a project. The properties may correspond to file extensions of the source code files and/or key words used within the source code files. Based on the properties, the ORM monitoring platform may determine a programming language associated with the source code files and an ORM framework used for the source code files.

At step 204, the ORM monitoring platform 104 may determine an AI model to be used for determining ORM files associated with the source code files. For example, the ORM monitoring platform may comprise different AI models, each associated with a different ORM framework and programming language. The ORM monitoring platform may select, among the plurality of AI models, an AI model corresponding to the ORM framework/programming language identified at step 204. As further described herein the AI models may be used for identifying ORM files, natural language processing (NLP) for determination of ORM metadata from the ORM files, and/or validating the ORM files.

Figure 3A:
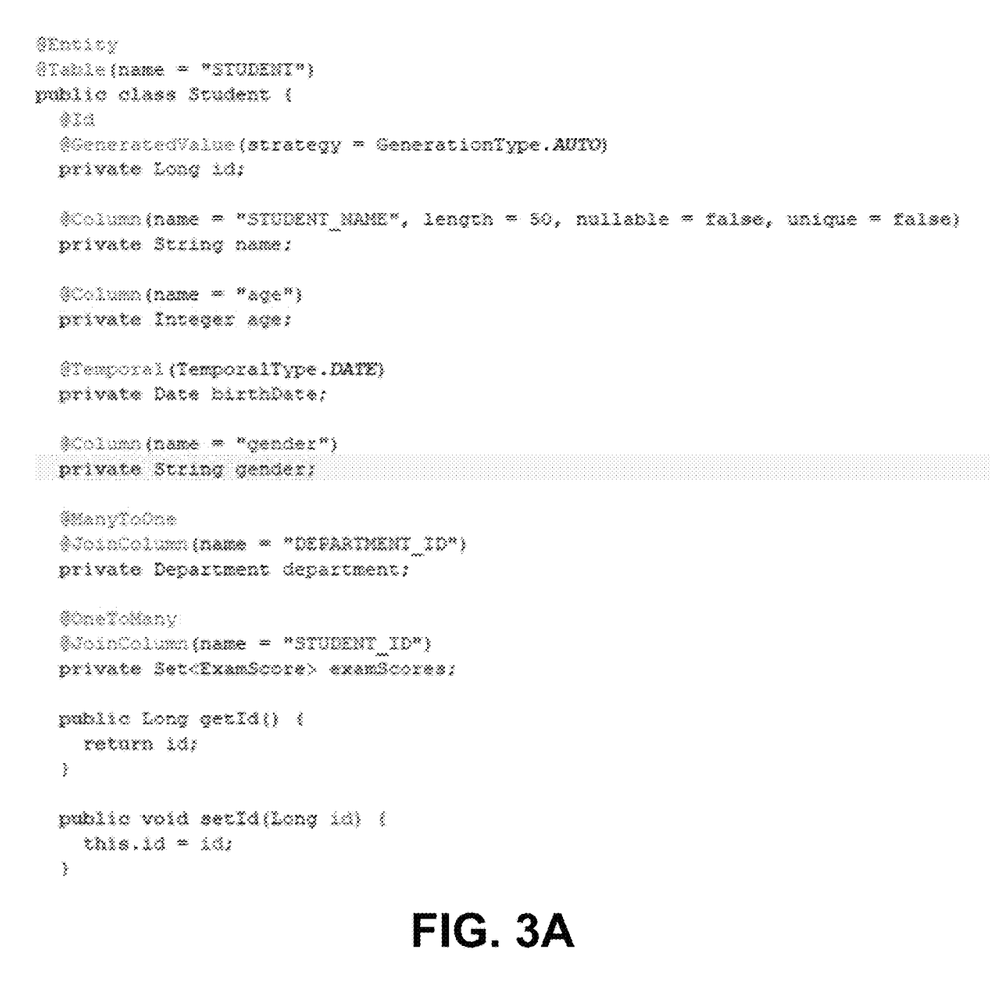
FIGS. 3A-3C show examples of ORM files corresponding to different programming languages, in accordance with one or more examples described herein.
Figure 3B:
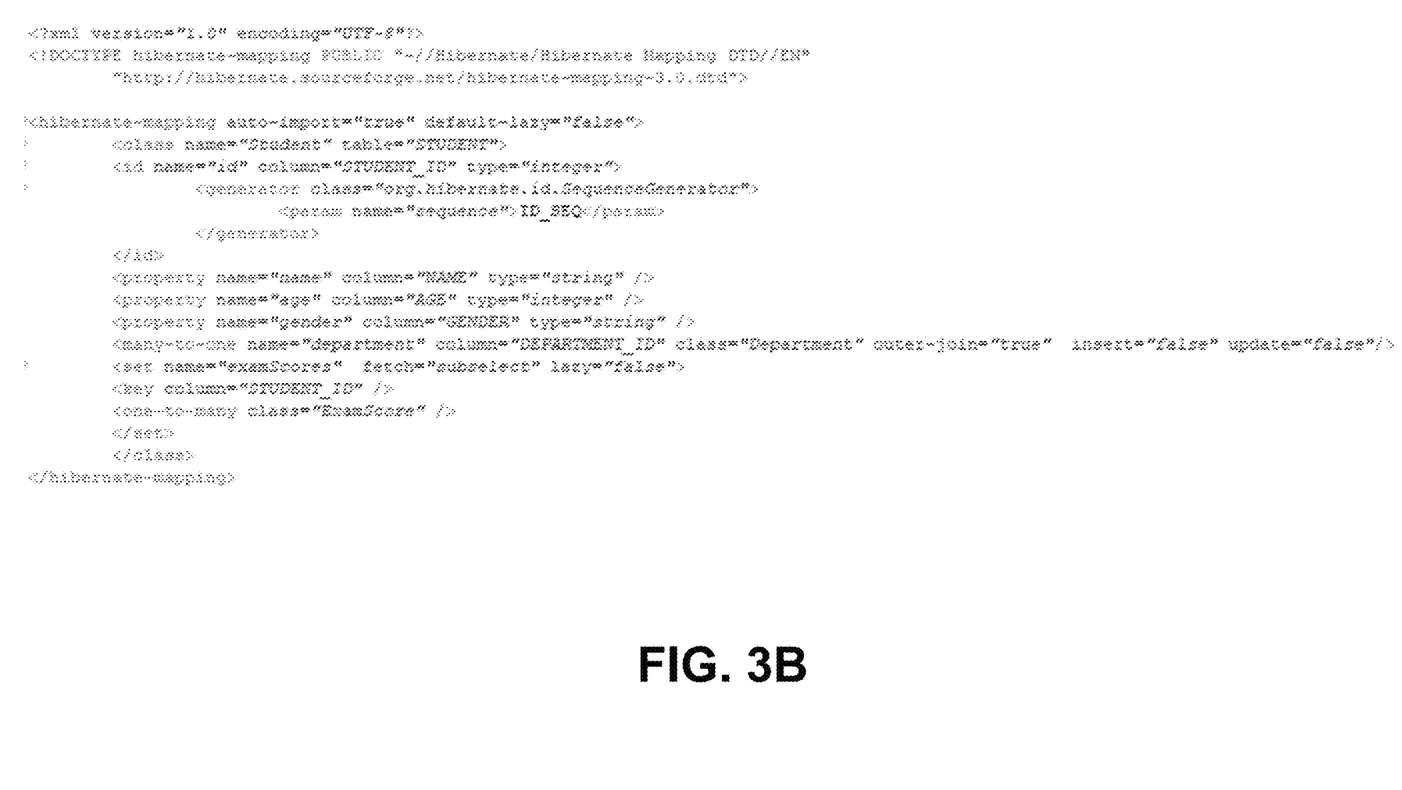
Figure 3C:
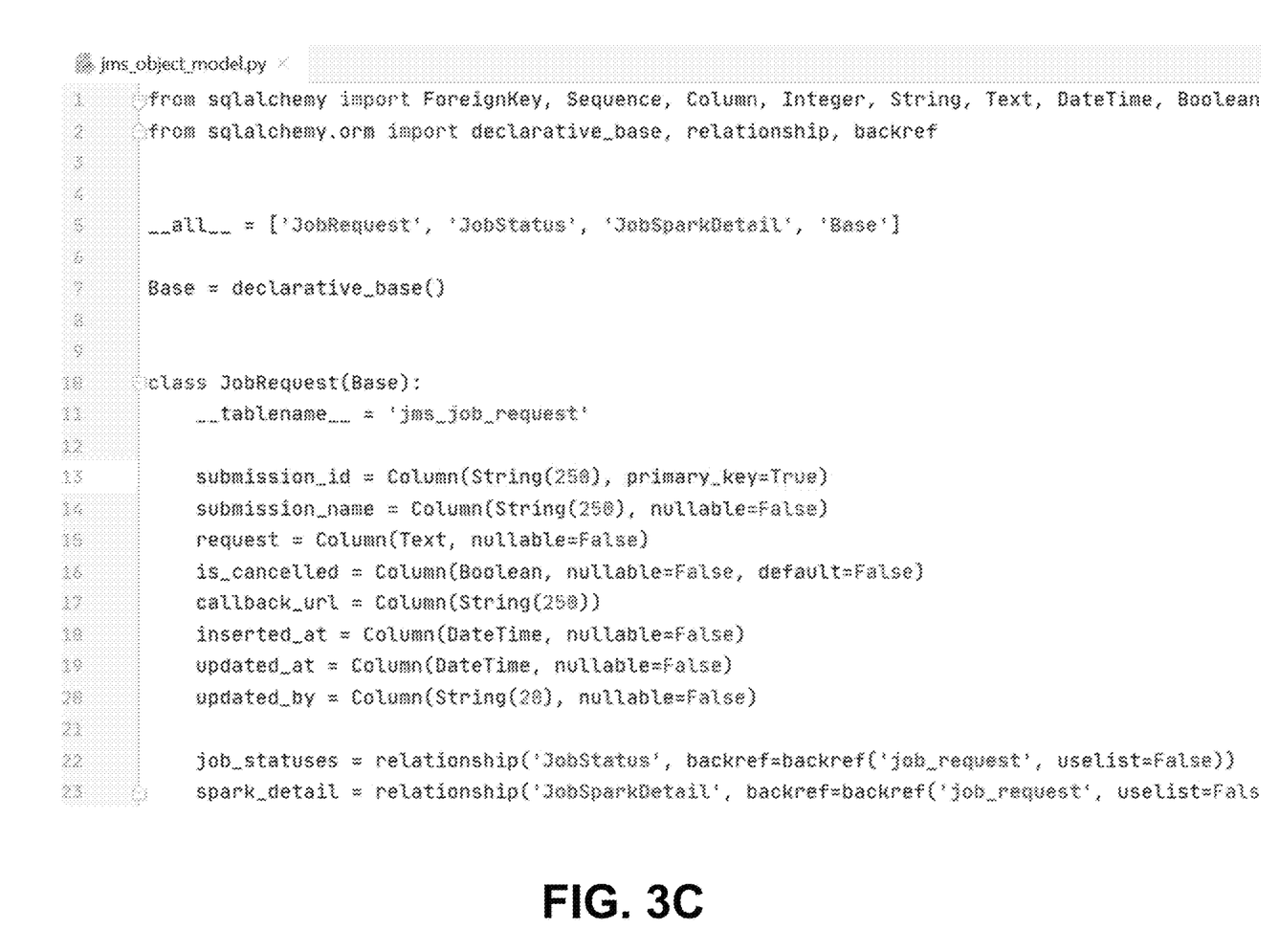

At step 206, the ORM monitoring platform 104 may load the selected AI model for execution. At step 208, and based on the selected AI model, the ORM monitoring platform 104 may identify ORM files (e.g., files which comprise ORM metadata). ORM metadata may correspond to identifying information of tables in a database, columns within the tables, relationships between objects (e.g., one-to-many, many-to-one, etc.). FIGS. 3A-3C show examples of ORM files corresponding to different programming languages. For example, the ORM files may be used to map columns in a target database to an object referenced in a source code file. For example, with respect to FIG. 3A, the ORM file may map a column "STUDENT_NAME" in a target database table "STUDENT" to an attribute "name" corresponding to an object "Student" defined in the programming language.

At step, 212, the ORM monitoring platform 104 may consolidate/preprocess data from the identified ORM files. At step 214, the ORM monitoring platform 104 may load an AI natural language processing (NLP) model for execution. The AI NLP model may correspond to the ORM framework identified at step 202.

At step 216, the ORM monitoring platform 104 may, based on the AI NLP model, determine the ORM metadata based on the ORM files. For example, the ORM metadata may comprise entities, such as table names/identifiers, column names/identifier, etc., as referenced in the ORM files. The ORM metadata may comprise mapping relationships (e.g., one-to-many, many-to-one) as referenced in the ORM files.

At step 218, the ORM monitoring platform 104 may determine the attributes associated with target databases corresponding to the ORM files (e.g., ORM metadata associated with the ORM files). The attributes may comprise a listing of tables, columns within the tables, mapping relations between the tables, etc. The ORM monitoring platform 104 may determine the attributes based on a database catalog file associated with the target databases. For example, the database catalog file may store indications of attributes of the target databases.

Additionally, or alternatively, the ORM monitoring platform 104 may determine the attributes based on a deployment log that stores information (e.g., attributes) associated with databases and/or any changes to the databases as requested by one or more users (e.g., via the user devices 102). The deployment log stores information associated with the databases, for example, when the databases are submitted for storage and/or are edited. For example, one or more user devices 102 may be used to edit/change a database (add/edit entries, tables, columns, mappings, etc.). A user device 102 may submit an SQL file (e.g., to the enterprise application host platform 106) that indicates edits to a database. The SQL file may be executed against the database, and the edits (e.g., indication of a column/row that was added/deleted, indication of the server at which the database was deployed, etc.) may be stored in the deployment log. In this manner, the deployment log maintains an updated listing of attributes associated with the databases.

The ORM monitoring platform 104 may determine databases for which corresponding information/attributes are to be stored in the database catalog and/or the deployment log. For example, the ORM monitoring platform 104 may store, in the database catalog, information/attributes associated with databases that are frequently accessed by the user devices 102 (e.g., accessed at a frequency greater than a threshold frequency). Frequency of accessing a database may correspond to one or more of: a number of queries for the database in a time period, a number of edits in the database in the time period, and/or a network bandwidth associated with the database.

At step 220, the ORM monitoring platform 104 may validate the ORM metadata based on determined attributes of the target databases (e.g., determined based on the database catalog, the deployment log, or by directly querying the target databases). Validating the ORM metadata may comprise determining whether the ORM metadata maps to the determined attributes of the target databases. For example, the ORM monitoring platform 104 may determine whether tables/columns referenced in the ORM files are present in the target databases. As another example, the ORM monitoring platform may determine whether mapping relationships associated with the ORM files correspond to mapping relationships associated with the target databases. For example, the ORM monitoring platform 104 may communicate with the target database (e.g., DB 221) to determine whether the ORM metadata corresponds to attributes present in the target databases. The ORM monitoring platform 104 may validate the ORM metadata (and perform one or more other steps of FIG. 2), for example, when a user device 102 requests compilation of submitted source code files.

Validating the ORM metadata may be based on an AI model generated based on databases and/or changes made to the databases. For example, the AI model may be trained (e.g., using supervised machine learning), based on attributes identified from the deployment log and ORM metadata associated with plurality of other ORM mapping files, to determine whether ORM metadata in a submitted ORM file is valid. The AI model may then be used to determine whether the ORM metadata (e.g., as determined at step 216) corresponds/maps to attributes of the target databases.

At step 222, the ORM monitoring platform 104 may consolidate the results corresponding to the ORM files, wherein the results may indicate whether an ORM file is validated against a corresponding target database. If an ORM file cannot be validated against its target database (e.g., a table/column referenced in the ORM file is not present in the target database), the ORM monitoring platform 104 may indicate an error (e.g., send an error notification to a user device 102).

At step 224, the ORM monitoring platform 104 may publish a validation result to a user device 102. For example, the validation result may be presented at the user device 104 when the user device 102 requests compilation of the source code at an IDE. The validation result may indicate whether the tables/columns referenced in the ORM file are present in the target database. The validation result may indicate an error, for example, if the tables/columns referenced in the ORM file are determine to be not present in the target database.

In an arrangement, a user associated with the user device 104 may override an error indicated by the validation result. In such a case, the user device 104 may send an message to the ORM monitoring platform 104, wherein the message may indicate that the user has overridden the error. The AI model may be trained based on this user input and used for future validation purposes.

Figure 4:
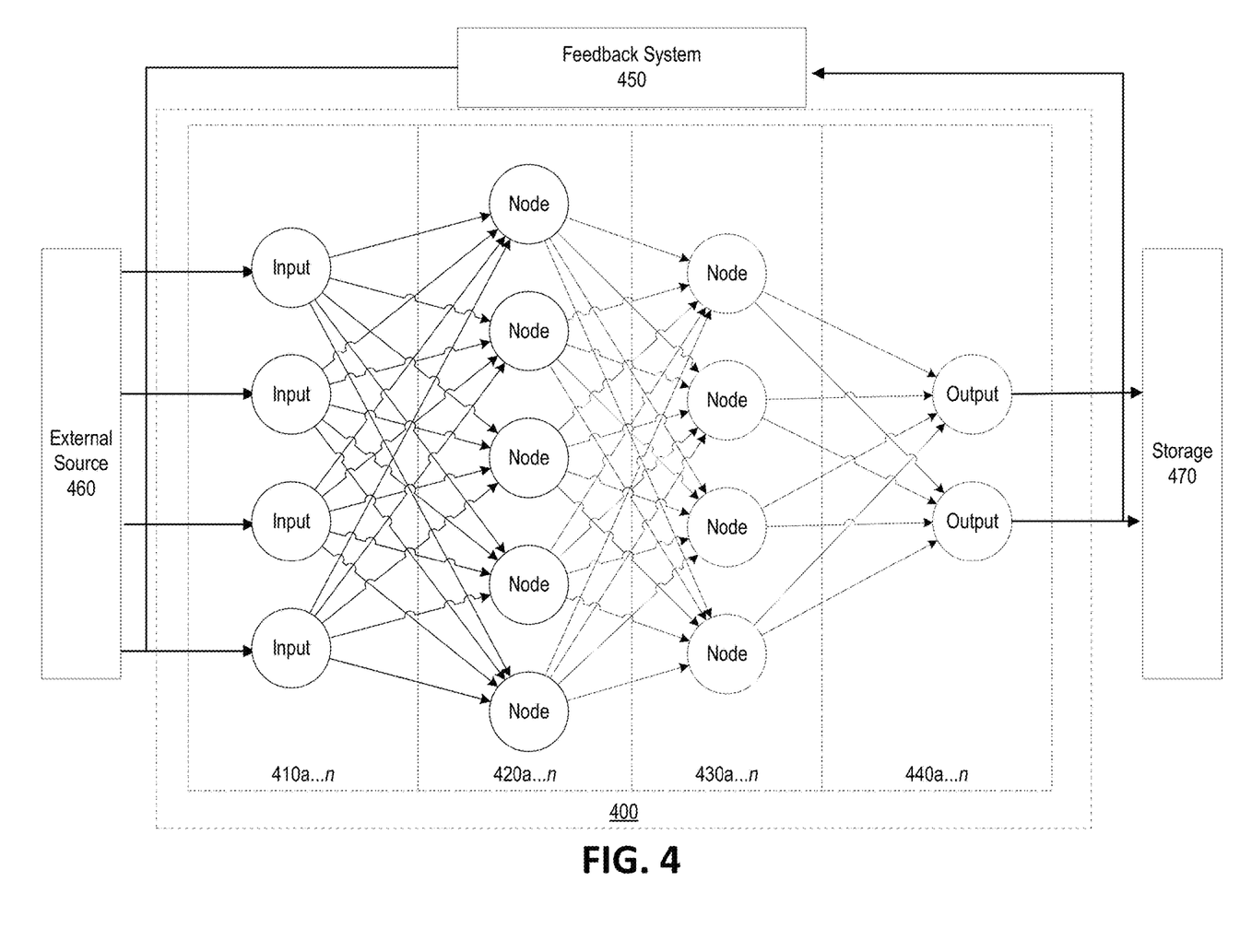
FIG. 4 illustrates a simplified example of an artificial neural network 400 on which a machine learning algorithm may be executed.

FIG. 4 illustrates a simplified example of an artificial neural network 400 on which a machine learning algorithm may be executed. The machine learning algorithm may be used at the ORM monitoring platform 104 (e.g., the AI engine 150-1) to perform one or more functions of the ORM monitoring platform 104, as described herein. FIG. 4 is merely an example of nonlinear processing using an artificial neural network; other forms of nonlinear processing may be used to implement a machine learning algorithm in accordance with features described herein.

In one example, a framework for a machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks. Such structures, while significantly more complex than conventional computer systems, are beneficial in implementing machine learning. For example, an artificial neural network may be comprised of a large set of nodes which, like neurons, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 1000 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "45% correct").

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

By way of example, in FIG. 4, each of input nodes 410a-n is connected to a first set of processing nodes 420a-n. Each of the first set of processing nodes 420a-n is connected to each of a second set of processing nodes 430a-n. Each of the second set of processing nodes 430a-n is connected to each of output nodes 440a-n. Though only two sets of processing nodes are shown, any number of processing nodes may be implemented. Similarly, though only four input nodes, five processing nodes, and two output nodes per set are shown in FIG. 4, any number of nodes may be implemented per set. Data flows in FIG. 4 are depicted from left to right: data may be input into an input node, may flow through one or more processing nodes, and may be output by an output node. Input into the input nodes 410a-n may originate from an external source 460. The input from the input nodes may be, for example, entities (e.g., table names/identifiers, column names/identifiers) associated with the mapping files and target database details (e.g., tables, columns, entries in the databases).

In one illustrative method using feedback system 450, the system may use machine learning to determine an output. The system may use one of a myriad of machine learning models including xg-boosted decision trees, auto-encoders, perceptron, decision trees, support vector machines, regression, and/or a neural network. The neural network may be any of a myriad of type of neural networks including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality. Output may be sent to a feedback system 450 and/or to storage 470. The output from the output node may be an indication of whether the mapping corresponding to the mapping file is valid (e.g., a table name/column name is present in the target database).

In an arrangement where the neural network 400 is used for identifying ORM files (e.g., step 208), the input from the input nodes may be various keywords in a (or plain text version of the) source code file, and the output may be an indication of whether a source code file is an ORM file. In an arrangement where the neural network 400 is used for identifying ORM metadata (e.g., entities) from ORM files (e.g., step 216), the input may be a plain text version of the ORM file, and the output may be the ORM metadata from the ORM file. In an arrangement where the neural network 400 is used for validating the ORM metadata (e.g., step 220), the input may be the ORM metadata and deployment log, and the output may be an indication of whether or not the ORM metadata is valid (e.g., entities from ORM files are present in the target database).

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting— regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially.

In one example, FIG. 4 depicts nodes that may perform various types of processing, such as discrete computations, computer programs, and/or mathematical functions implemented by a computing device. For example, the input nodes 410a-n may comprise logical inputs of different data sources, such as one or more data servers. The processing nodes 420a-n may comprise parallel processes executing on multiple servers in a data center. And, the output nodes 440a-n may be the logical outputs that ultimately are stored in results data stores, such as the same or different data servers as for the input nodes 410a-n. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 400 may learn and/or be dynamically reconfigured. Though nodes are depicted as having connections only to successive nodes in FIG. 4, connections may be formed between any nodes. For example, one processing node may be configured to send output to a previous processing node.

Input received in the input nodes 410a-n may be processed through processing nodes, such as the first set of processing nodes 420a-n and the second set of processing nodes 430a-n. The processing may result in output in output nodes 440a-n. As depicted by the connections from the first set of processing nodes 420a-n and the second set of processing nodes 430a-n, processing may comprise multiple steps or sequences. For example, the first set of processing nodes 420a-n may be a rough data filter, whereas the second set of processing nodes 430a-n may be a more detailed data filter.

The artificial neural network 400 may be configured to effectuate decision-making. As a simplified example for the purposes of explanation, the artificial neural network 400 may be configured to detect faces in photographs. The input nodes 410a-n may be provided with a digital copy of a photograph. The first set of processing nodes 420a-n may be each configured to perform specific steps to remove non-facial content, such as large contiguous sections of the color red. The second set of processing nodes 430a-n may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 400 may then predict the location on the face. The prediction may be correct or incorrect.

The feedback system 450 may be configured to determine whether or not the artificial neural network 400 made a correct decision. Feedback may comprise an indication of a correct answer and/or an indication of an incorrect answer and/or a degree of correctness (e.g., a percentage). For example, in the facial recognition example provided above, the feedback system 450 may be configured to determine if the face was correctly identified and, if so, what percentage of the face was correctly identified. The feedback system 450 may already know a correct answer, such that the feedback system may train the artificial neural network 400 by indicating whether it made a correct decision. The feedback system 450 may comprise human input, such as an administrator telling the artificial neural network 400 whether it made a correct decision. The feedback system may provide feedback (e.g., an indication of whether the previous output was correct or incorrect) to the artificial neural network 400 via input nodes 410a-n or may transmit such information to one or more nodes. The feedback system 450 may additionally or alternatively be coupled to the storage 470 such that output is stored. The feedback system may not have correct answers at all, but instead base feedback on further processing: for example, the feedback system may comprise a system programmed to identify faces, such that the feedback allows the artificial neural network 400 to compare its results to that of a manually programmed system.

The artificial neural network 400 may be dynamically modified to learn and provide better input. Based on, for example, previous input and output and feedback from the feedback system 450, the artificial neural network 400 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 400, such that the artificial neural network 400 may vary its nodes and connections to test hypotheses.

The artificial neural network 400 need not have a set number of processing nodes or number of sets of processing nodes, but may increase or decrease its complexity. For example, the artificial neural network 400 may determine that one or more processing nodes are unnecessary or should be repurposed, and either discard or reconfigure the processing nodes on that basis. As another example, the artificial neural network 400 may determine that further processing of all or part of the input is required and add additional processing nodes and/or sets of processing nodes on that basis.

The feedback provided by the feedback system 450 may be mere reinforcement (e.g., providing an indication that output is correct or incorrect, awarding the machine learning algorithm a number of points, or the like) or may be specific (e.g., providing the correct output). For example, the machine learning algorithm 400 may be asked to detect faces in photographs. Based on an output, the feedback system 450 may indicate a score (e.g., 75% accuracy, an indication that the guess was accurate, or the like) or a specific response (e.g., specifically identifying where the face was located).

The artificial neural network 400 may be supported or replaced by other forms of machine learning. For example, one or more of the nodes of artificial neural network 400 may implement a decision tree, associational rule set, logic programming, regression model, cluster analysis mechanisms, Bayesian network, propositional formulae, generative models, and/or other algorithms or forms of decision-making. The artificial neural network 400 may effectuate deep learning.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system for artificial intelligence (AI)-based monitoring of object-relational mapping (ORM) files, the system comprising:
   a relational database server communicatively coupled with a user device; and
   an ORM monitoring platform, communicatively coupled to the of user device, the ORM monitoring platform comprising:
   a processor; and
   memory storing computer-readable instructions that, when executed by the processor, cause the ORM monitoring platform to:
      store, in a database catalog file and based on usages of databases stored in the relational database server, attributes associated with the databases, wherein:
         a usage of a respective database is based on at least one of a number of queries for the respective database in a time period, a number of edits in the respective database in the time period, or a network bandwidth associated with the respective database, and
         the attributes are determined based on a deployment log;
      train an artificial intelligence (AI) model based on the attributes associated with the databases;
      receive, from the user device, a request for compilation of a plurality of source code files; and
      based on receiving the request for compilation:
         identify, among the plurality of source code files, one or more ORM files;
         validate, based on the AI model, the one or more ORM files; and
         send, to the user device, based on the validation of the one or more ORM files, a validation indication.

2. The system of claim 1, wherein the computer-readable instructions that, when executed by the processor, cause the ORM monitoring platform to:
   determine, based on the one or more ORM files, ORM metadata.

3. The system of claim 2, wherein the ORM metadata comprises at least one of:
   indications of tables;
   indications of columns; and
   combination thereof.

4. The system of claim 2, wherein the attributes associated with the databases comprise at least one of:
   tables included in the databases;
   columns included in the databases; and
   combination thereof.

5. The system of claim 4, wherein the sending the validation indication comprises sending an error notification based on determining that ORM metadata associated with an ORM file does not match attributes of a corresponding database.

6. The system of claim 1, wherein the deployment log stores the attributes associated with the databases when the databases are submitted to the relational database server.

7. The system of claim 1, wherein the deployment log stores the attributes associated with the databases when the databases are edited in the relational database server.

8. The system of claim 1, wherein the computer-readable instructions that, when executed by the processor, cause the ORM monitoring platform to:
   validate, based on the database catalog file, the one or more ORM files.

9. The system of claim 1, wherein storing attributes associated with the databases in the database catalog file comprises determining that relative usages of the databases are greater than a threshold value.

10. A method involving an artificial intelligence (AI) model trained based on attributes associated with databases stored in a relational database server, the method comprising:
   determining the databases based on usages of the databases, wherein a usage of a respective database is based on at least one of a number of queries for the respective database in a time period, a number of edits in the respective database in the time period, or a network bandwidth associated with the respective database,
   causing determining of the attributes associated with the databases based on a deployment log;
   receiving, from a user device, a request for compilation of a plurality of source code files; and
   based on receiving the request for compilation:
      identifying, among the plurality of source code files, one or more object relational mapping (ORM) files;
      validating, based on the AI model as trained, the one or more ORM files; and
      sending, to the user device, based on the validation of the one or more ORM files, a validation indication.

11. The method of claim 10, further comprising:
   determining, based on the one or more ORM files, ORM metadata.

12. The method of claim 11, wherein the ORM metadata comprises at least one of:
   indications of tables;
   indications of columns; and
   combination thereof.

13. The method of claim 11, wherein the attributes associated with the databases comprise at least one of:
   tables included in the databases;
   columns included in the databases; and
   combination thereof.

14. The method of claim 13, wherein the sending the validation indication comprises sending an error notification based on determining that ORM metadata associated with an ORM file does not match attributes of a corresponding database.

15. The method of claim 10, wherein the deployment log stores the attributes associated with the databases when the databases are submitted to the relational database server.

16. The method of claim 10, wherein the deployment log stores the attributes associated with the databases when the databases are edited in the relational database server.

17. A non-transitory computer-readable medium storing computer-executable instructions that, when executed by a computer processor, causes a computing platform to:
   determine, based on usages of databases stored in the relational database server, attributes associated with the databases, wherein:
      a usage of a respective database is based on at least one of a number of queries for the respective database in a time period, a number of edits in the respective database in the time period, or a network bandwidth associated with the respective database, and
      the attributes are determined based on a deployment log;
   cause to train an artificial intelligence (AI) model based on the attributes associated with the databases;
   receive, from a user device, a request for compilation of a plurality of source code files; and
   based on receiving the request for compilation:
      identify, among the plurality of source code files, one or more ORM files;
      validate, based on the AI model, the one or more ORM files; and
      send, to the user device, based on the validation of the one or more ORM files, a validation indication.

18. The non-transitory computer-readable medium of claim 17, wherein the instructions, when executed by the computer processor, causes the computing platform to determine, based on the one or more ORM files, ORM metadata, wherein the ORM metadata comprises at least one of:
   indications of tables;
   indications of columns; and
   combination thereof.

* * * * *